United States Patent
Guen

(10) Patent No.: US 9,997,747 B2
(45) Date of Patent: *Jun. 12, 2018

(54) RECHARGEABLE BATTERY HAVING UPPER INSULATOR MEMBER

(71) Applicant: SAMSUNG SDI CO., LTD., Yongin-si, Gyeonggi-do (KR)

(72) Inventor: Min-Hyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 633 days.

This patent is subject to a terminal disclaimer.

(21) Appl. No.: 14/200,207

(22) Filed: Mar. 7, 2014

(65) Prior Publication Data

US 2015/0037628 A1    Feb. 5, 2015

(30) Foreign Application Priority Data

Aug. 5, 2013 (KR) ........................ 10-2013-0092651

(51) Int. Cl.
  *H01M 2/34* (2006.01)
  *H01M 2/04* (2006.01)
  (Continued)

(52) U.S. Cl.
  CPC ............... *H01M 2/04* (2013.01); *H01M 2/30* (2013.01); *H01M 2/345* (2013.01); *H01M 2/08* (2013.01);
  (Continued)

(58) Field of Classification Search
  CPC ...... H01M 2/04; H01M 2/08; H01M 2200/00; H01M 2/30; H01M 2/345; H01M 2/1241
  (Continued)

(56) References Cited

U.S. PATENT DOCUMENTS

| 2011/0052949 A1* | 3/2011 | Byun | ............... H01M 2/043 429/61 |
| 2011/0183198 A1* | 7/2011 | Byun | ............... H01M 2/0456 429/185 |

(Continued)

FOREIGN PATENT DOCUMENTS

| JP | 2004-221025 A | 8/2004 |
| KR | 10-2012-0136105 A | 12/2012 |

(Continued)

OTHER PUBLICATIONS

Korean Notice of Allowance dated Jan. 24, 2017 of the corresponding Korean Patent Application No. 10-2013-0092651.

*Primary Examiner* — Jonathan G Jelsma
*Assistant Examiner* — Omar M Kekia
(74) *Attorney, Agent, or Firm* — Lee & Morse P.C.

(57) ABSTRACT

A rechargeable battery includes an electrode assembly including a first electrode and a second electrode, a case in which the electrode assembly is mounted, a cap plate coupled to the case, the cap plate including a short-circuit hole therethrough, a first terminal electrically connected to the first electrode, a second terminal electrically connected to the second electrode, an upper insulating member between the second terminal and the cap plate, the upper insulating member including a connection hole in fluid communication with the short-circuit hole, and an air vent hole spaced apart from the connection hole, and a short-circuit member in the short-circuit hole, the short-circuit member being between the cap plate and the upper insulating member, and the short-circuit member being configured to deform to electrically connect the first electrode with the second electrode.

16 Claims, 8 Drawing Sheets

(51) Int. Cl.
*H01M 2/30* (2006.01)
*H01M 2/08* (2006.01)
*H01M 2/12* (2006.01)

(52) U.S. Cl.
CPC ...... *H01M 2/1241* (2013.01); *H01M 2200/00* (2013.01)

(58) Field of Classification Search
USPC .......................................................... 429/61
See application file for complete search history.

(56) References Cited

U.S. PATENT DOCUMENTS

| | | | | |
|---|---|---|---|---|
| 2012/0064394 A1* | 3/2012 | Kim | ................... | H01M 2/0217 |
| | | | | 429/181 |
| 2012/0237802 A1* | 9/2012 | Byun | ................... | H01M 2/043 |
| | | | | 429/53 |
| 2012/0258339 A1 | 10/2012 | Kim | | |
| 2012/0315515 A1 | 12/2012 | Guen | | |
| 2012/0315516 A1 | 12/2012 | Kim | | |
| 2013/0029190 A1 | 1/2013 | Kim | | |
| 2014/0315056 A1* | 10/2014 | Guen | ................... | H01M 2/345 |
| | | | | 429/61 |

FOREIGN PATENT DOCUMENTS

| KR | 10-2012-0136267 A | 12/2012 |
|---|---|---|
| KR | 10-1222232 B1 | 1/2013 |
| KR | 10-2013-0013787 A | 2/2013 |

* cited by examiner

RECHARGEABLE BATTERY HAVING UPPER INSULATOR MEMBER

CROSS-REFERENCE TO RELATED APPLICATION

Korean Patent Application No. 10-2013-0092651, filed on Aug. 5, 2013, in the Korean Intellectual Property Office, and entitled: "Rechargeable Battery Having Upper Insulator Member," is incorporated by reference herein in its entirety.

BACKGROUND

1. Field

The described technology relates generally to a rechargeable battery. More particularly, the described technology relates generally to a rechargeable battery including a safety apparatus having an improved structure.

2. Description of the Related Art

A rechargeable battery can be repeatedly charged and discharged, unlike a primary battery that is incapable of being recharged. A rechargeable battery of a low capacity may be used for a small portable electronic device, e.g., a mobile phone, a laptop computer, and a camcorder, and a rechargeable battery of a large capacity may be used as a power source, e.g., for driving a motor of a hybrid vehicle, etc.

A high power rechargeable battery using a non-aqueous electrolyte with high energy density has been developed, and the high power rechargeable battery is formed as a large capacity rechargeable battery by connecting a plurality of rechargeable batteries in series to use for driving a motor of a device, e.g., an electric vehicle requiring a large amount of electric power. Further, the rechargeable battery may be formed, e.g., in a cylindrical shape and a square shape.

SUMMARY

An exemplary embodiment provides a rechargeable battery including an electrode assembly including a first electrode and a second electrode, a case in which the electrode assembly is mounted, a cap plate coupled to the case, the cap plate including a short-circuit hole therethrough, a first terminal electrically connected to the first electrode, a second terminal electrically connected to the second electrode, an upper insulating member between the second terminal and the cap plate, the upper insulating member including a connection hole in fluid communication with the short-circuit hole, and an air vent hole spaced apart from the connection hole, and a short-circuit member in the short-circuit hole, the short-circuit member being between the cap plate and the upper insulating member, and the short-circuit member being configured to deform to electrically connect the first electrode with the second electrode.

The rechargeable may further include an upper gasket between the upper insulating member and the second terminal, the upper gasket surrounding the connection hole and the air vent hole.

The upper gasket may include an upper sealing portion partially surrounding a circumference of the connection hole, and a connection sealing portion protruding from a first end portion of the upper sealing portion toward the air vent hole, the connection sealing portion surrounding the air vent hole.

The upper sealing portion may include first and second upper sealing portions connected to each other via the connection sealing portion.

The upper gasket may further include a support plate extending toward an outside of the upper gasket, the support plate being connected to a second end portion of the upper sealing portion.

The rechargeable battery may further include a lower gasket between the upper insulating member and the short-circuit member, the lower gasket including a lower sealing portion surrounding the connection hole.

The lower sealing portion may surround only the connection hole among the connection hole and the air vent hole, the lower sealing portion cutting off fluid communication between the connection hole and the air vent hole.

The lower sealing portion may have a circular ring shape.

The lower gasket may further include a guide protrusion protruding from the lower sealing portion toward the air vent hole, the guide protrusion partially surrounding the air vent hole.

The lower gasket may further include a guide plate attached to the guide protrusion and to the lower sealing portion, the guide plate being inside the guide protrusion, and a guide hole in the guide plate, the guide hole being in fluid communication with the air vent hole.

The lower gasket may further include a support plate extending toward the outside of the lower gasket, support plate being connected to a first end portion of the lower sealing portion.

The rechargeable battery may further include a connection terminal electrically connecting the second terminal with the second electrode, and a terminal hole in the upper insulating member, the connection terminal being inserted into the terminal hole.

The upper insulating member may further include a lower plate contacting a bottom surface of the second terminal, and a side wall along a side end of the lower plate, the side wall protruding above the lower plate and surrounding a side surface of the second terminal.

The upper insulating member may further include a support protrusion with a catching portion protruding toward a center of the lower plate, a support jaw of the second terminal being coupled to the support protrusion.

The first terminal may be electrically connected to the cap plate through a connection plate, the short-circuit member being electrically connected to the second terminal through the cap plate.

The short-circuit member may include a downwardly convex curved portion, and an edge outside the curved portion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
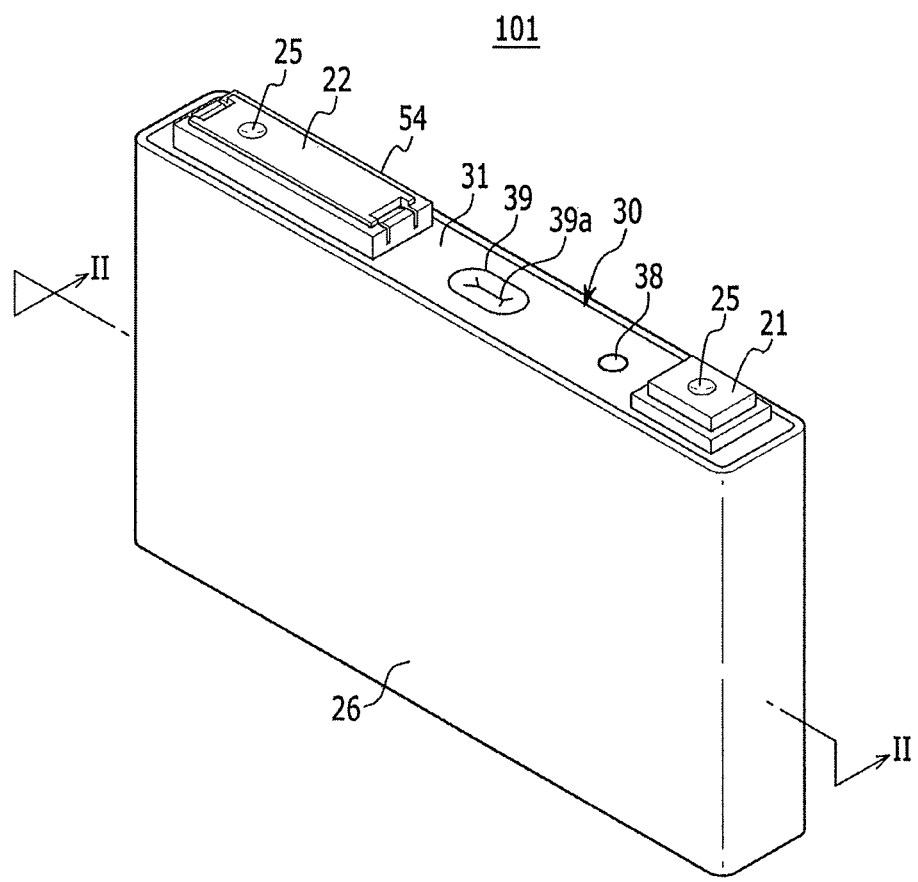
FIG. 1 illustrates a perspective view of a rechargeable battery in accordance with an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
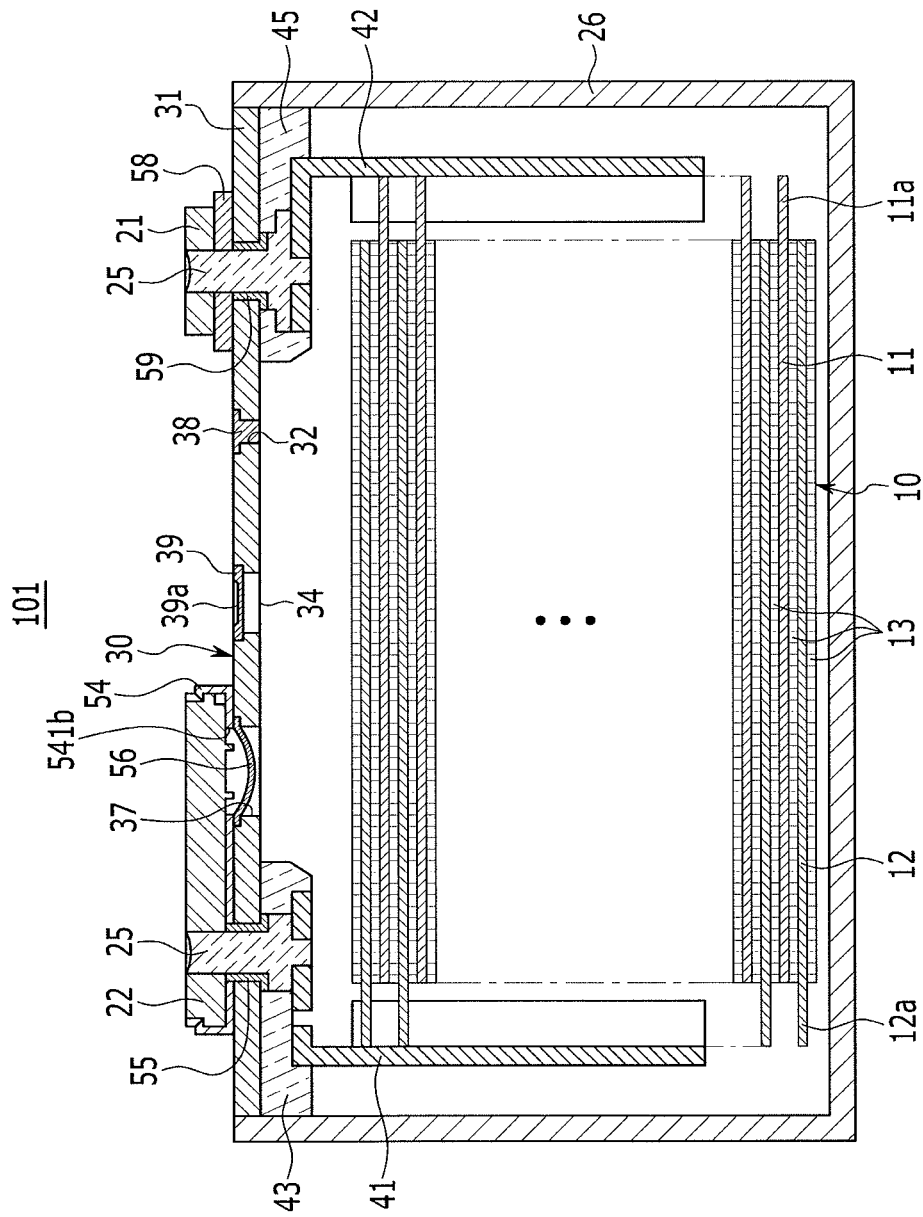
FIG. 2 illustrates a cross-sectional view taken along line II-II of FIG. 1.

FIG. 1 illustrates a perspective view of a rechargeable battery in accordance with an exemplary embodiment. FIG. 2 illustrates a cross-sectional view along line II-II of FIG. 1.

Referring to FIG. 1 and FIG. 2, a rechargeable battery 101 in accordance with the present exemplary embodiment may include an electrode assembly 10 formed by, e.g., winding a positive electrode (first electrode) 11 and a negative electrode (second electrode) 12 while interposing a separator 13 therebetween, a case 26 in which the electrode assembly 10 is installed, and a cap assembly 30 coupled to an opening of the case 26.

The rechargeable battery 101 of the present exemplary embodiment is exemplarily illustrated as a lithium ion rechargeable battery formed in the shape of a cuboid. However, the present exemplary embodiment is not limited thereto, e.g., embodiments may include various types of batteries including a lithium polymer battery or a cylindrical battery.

The positive electrode 11 and the negative electrode 12 include coated regions, i.e., where an active material is coated to a current collector formed of a thin metal foil, and uncoated regions 11a and 12a, i.e., where the active material is not coated. The positive electrode uncoated region 11a is formed at one end of the positive electrode 11 along a length direction of the positive electrode 11, and the negative uncoated region 12a is formed at one end of the negative electrode 12 along a length direction of the negative electrode 12. The positive electrode uncoated region 11a and the negative uncoated region 12a are formed at opposite ends of the electrode assembly 10. The positive electrode 11 and the negative electrode 12 may be spirally wound, interposing the separator 13, which is an insulator, therebetween.

However, the present exemplary embodiment is not limited thereto. For example, the electrode assembly 10 may have a structure in which a plurality of positive electrodes and negative electrodes formed in a sheet shape are stacked while interposing a separator therebetween.

The case 26 may be formed as an approximate cuboid, and an opening is formed on a side thereof. For example, the case 26 may be made of metal, e.g., aluminum, stainless steel, and the like.

The cap assembly 30 may include a cap plate 31 covering the opening of the case 26, a first terminal 21 protruding toward the outside of the cap plate 31 and electrically connected to the positive electrode 11, and a second terminal 22 protruding toward the outside of the cap plate 31 and electrically connected to the negative electrode 12.

The cap plate 31 may be formed in the shape of an elongated plate extended in one direction, and is coupled to the opening of the case 26. A sealing cap 38 provided in an electrolyte injection opening 32, and a vent plate 39 in which a notch 39a is formed to be ruptured at a predetermined pressure to open a vent hole 34, are provided in the cap plate 31.

The first terminal 21 and the second terminal 22 are installed to protrude toward an upper portion of the cap plate 31. The first terminal 21 is electrically connected to the negative electrode 12 through a current collecting tab 42, and the second terminal 22 is electrically connected to the positive electrode 11 through a current collecting tab 41. However, the present exemplary embodiment is not limited thereto, e.g., the first terminal 21 may be electrically connected to the positive electrode 11 and the second terminal 22 may be electrically connected to the negative electrode 12.

As shown in FIGS. 1-2, the first terminal 21 may be formed to have a rectangular plate shape. The first terminal 21 is electrically connected to the negative electrode 12 through a connection terminal 25 coupled to the current collecting tab 42. The connection terminal 25 coupled to the first terminal 21 has the same structure as that of the connection terminal 25 coupled to the second terminal 22.

A sealing gasket 59 for sealing is inserted into a hole through which the connection terminal 25 is extended between the first terminal 21 and the cap plate 3. A lower insulating member 45 is installed below the cap plate 31 to insulate the first terminal 21 and the current collecting tab 42 from the cap plate 31.

A connection plate 58 is installed below the first terminal 21 to electrically connect the first terminal 21 and the cap plate 31 with each other. The connection terminal 25 is installed in the connection plate 58 to extend therethrough, and the connection plate 58 is located between the cap plate 31 and the first terminal 21. With such a structure, the cap plate 31 may be electrically connected to the first terminal 21.

Figure 3:
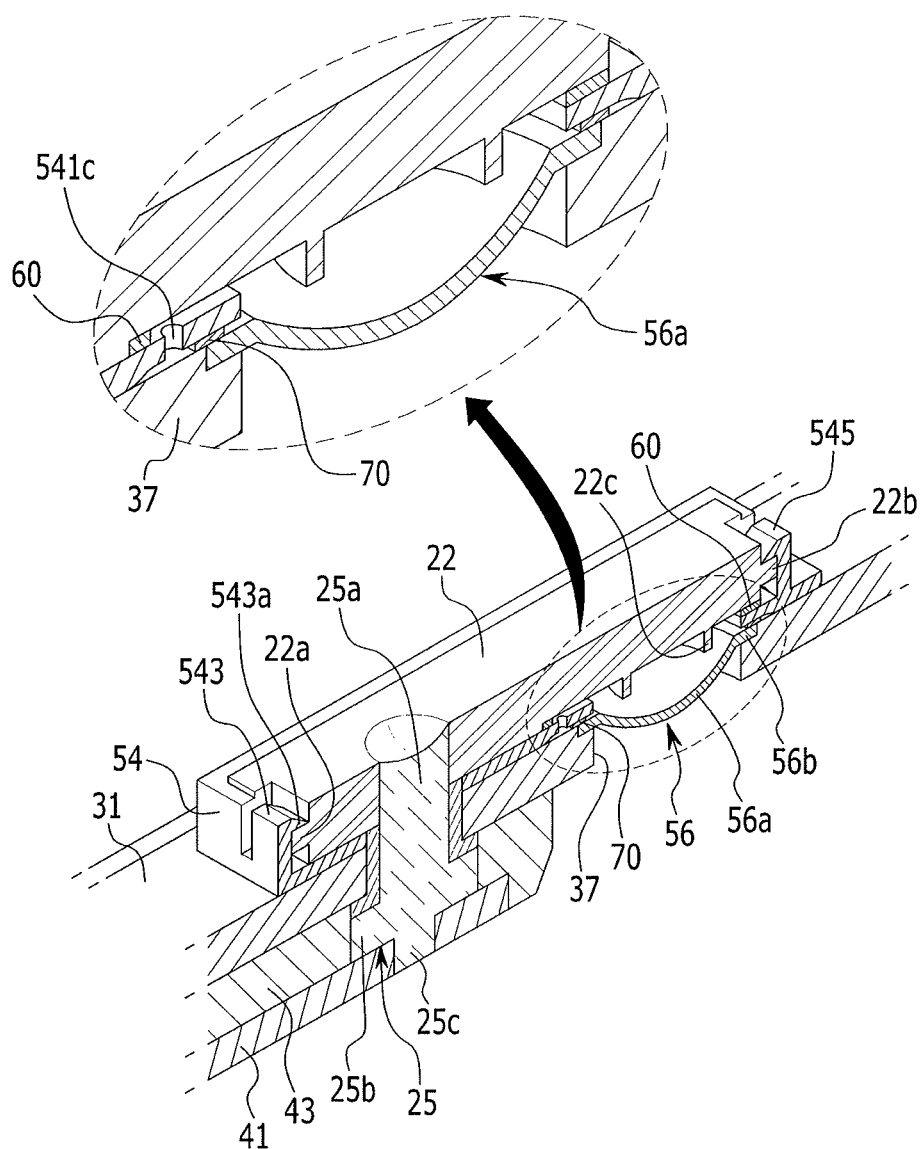
FIG. 3 illustrates a partial perspective view of a terminal of the rechargeable battery in FIG. 1.

Similarly, as illustrated in FIGS. 2-3, the second terminal 22 is formed to have a rectangular plate shape. The second terminal 22 is electrically connected to the positive electrode 11 through the connection terminal 25 coupled to the current collecting tab 41. The connection terminal 25 may include a stem 25a extended through the cap plate 31 and the second terminal 22. As illustrated in FIG. 3, the stem 25a may have an upper end secured to the second terminal 22, a lower flange 25b externally protruding from a lower end of the stem 25a, and a lower protrusion 25c downwardly protruding from the lower end of the stem 25a and inserted into the current collecting tab 41 to be welded and secured thereto.

A sealing gasket 55 for sealing is inserted into a hole through which the connection terminal 25 is extended between the second terminal 22 and the cap plate 31. A lower insulating member 43 is installed below the cap plate 31 to insulate the second terminal 22 and the current collecting tab 41 from the cap plate 31.

As illustrated in FIG. 3, a short-circuit protrusion 22c may protrude toward a short-circuit hole 37 formed at a lower portion of the second terminal 22. The second terminal 22 is elongated and extended in one direction to cover the short-circuit hole 37. An upper insulating member 54 may be installed between the second terminal 22 and the cap plate 31 to electrically insulate the second terminal 22 from the cap plate 31.

As shown in FIGS. 2-3, the cap assembly 30 includes a short-circuit member 56 for short-circuiting the positive electrode 11 and the negative electrode 12. Accordingly, the short-circuit member 56 is electrically connected to the cap plate 31 and is deformed to be connected to the second terminal 22 when internal pressure of the rechargeable battery 101 is increased.

The short-circuit hole 37 is formed in the cap plate 31, and the short-circuit member 56 is disposed in the short-circuit hole 37 between the upper insulating member 54 and the cap plate 31. The short-circuit member 56 includes an arc-shaped curve portion 56a which is downwardly convex, and an edge 56b formed outside the curve portion 56a and secured to the cap plate 31. With such a structure, the downwardly convex curve portion 56a of the short-circuit member 56 is deformed at a predetermined pressure into an upwardly convex shape. In this case, the short-circuit protrusion 22c is brought into contact with the short-circuit member 56.

Figure 4:
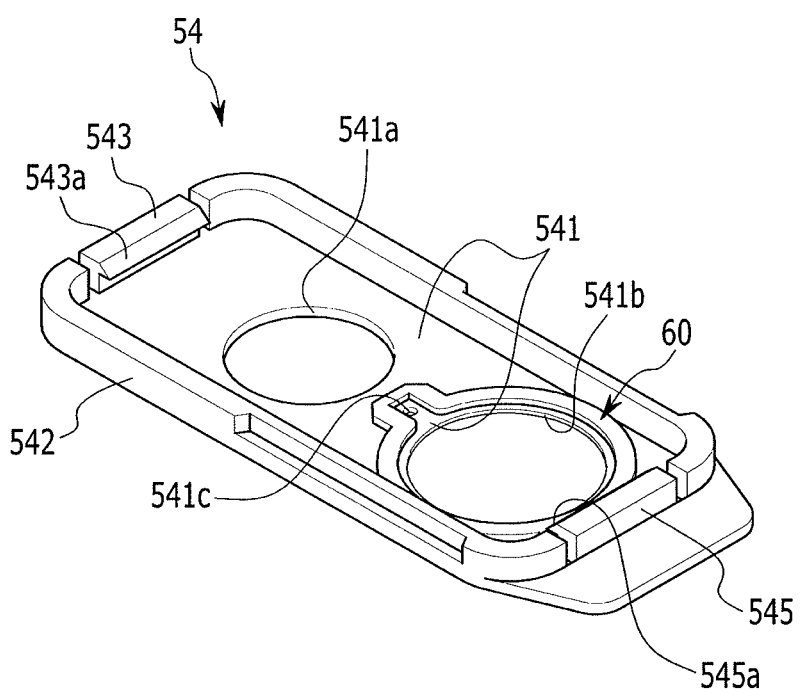
FIG. 4 illustrates a perspective view of an upper insulating member and an upper gasket when viewed from the top in accordance with the present exemplary embodiment.
Figure 5:
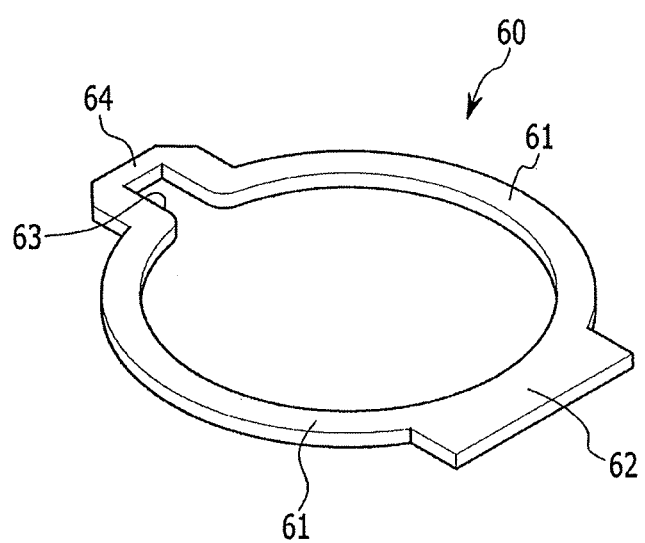
FIG. 5 illustrates a perspective view showing the upper gasket in accordance with the present exemplary embodiment.

FIG. 4 illustrates a perspective view of the upper insulating member 54 and an upper gasket when viewed from the top, and FIG. 5 illustrates an enlarged perspective view of the upper gasket in accordance with the present exemplary embodiment.

Referring to FIGS. 3-4, the upper insulating member 54 may include a lower plate 541, a side wall 542 protruding from a side end of the lower plate 541, and support protrusions 543 and 545 formed to protrude at opposite side ends of the upper insulating member 54.

The lower plate 541 has a substantially quadrangular plate shape, and a lower surface of the second terminal 22 may be brought into contact with the lower plate 541 (FIG. 3). The second terminal 22 is located above the lower plate 541.

A terminal hole 541a and a connection hole 541b are formed in the lower plate 541, e.g., the terminal hole 541a and the connection hole 541b may be formed through an entire thickness of the lower plate 541. The connection terminal 25 is inserted into the terminal hole 541a, and the connection hole 541b is located above the short-circuit hole 37 and communicates therewith. For example, as illustrated in FIGS. 2-3, the connection hole 541b of the upper insulating member 54 and the short-circuit hole 37 in the cap plate 30 may overlap each other and may be in fluid communication with each other.

Further, as illustrated in FIGS. 3-4, an air vent hole 541c is formed between the terminal hole 541a and the connection hole 541b, e.g., the air vent hole 541c may extend through the entire thickness of the lower plate 541. The air vent hole 541c is disposed separately from and adjacent to the connection hole 541b, and is in fluid communication therewith. That is, while a portion of the lower plate 541 may separate the air vent hole 541c from the connection hole 541b, the air vent hole 541c and the connection hole 541b may still be in fluid communication with each other via a space thereabove. Therefore, the air vent hole 541c provides a path for exhausting gas from a space above the short-circuit member 56 when the short-circuit member 56 is reversely deformed. That is, as illustrated in FIG. 3, since the short-circuit hole 37, the connection hole 541b, and the air vent hole 541c are in fluid communication with each other, gas displaced from the connection hole 541b, e.g., when the short-circuit member 56 inverts upward, may flow into the air vent hole 541c.

The side wall 542 is formed along a side end of the lower plate 541 to surround a side surface of the second terminal 22. As illustrated in FIG. 3, the support protrusions 543 and 545 are respectively hooked to support jaws 22a and 22b formed on the second terminal 22 to support the second terminal 22. The support jaws 22a and 22b are respectively formed as a step at opposite ends of the second terminal 22 in a longitudinal direction to be coupled to the support protrusions 543 and 545. The support protrusions 543 and 545 respectively include catching portions 543a and 545a protruding toward the inside of the lower plate 541, to support the second terminal 22 by hooking the catching portions 543a and 545a to, e.g., overlap portions of, upper surfaces of the support jaws 22a and 22b.

An upper gasket 60, which surrounds the connection hole 541b, is installed above the lower plate 541, and a lower gasket 70, which surrounds the connection hole 541b, is installed below the lower plate 541. That is, as illustrated in FIG. 3, a portion of the connection hole 541b may be between the lower and upper gaskets 70 and 60.

As shown in FIG. 3, the upper gasket 60 is installed between the second terminal 22 and the upper insulating member 54. As shown in FIG. 4 and FIG. 5, the upper gasket 60 is installed above the connection hole 541b in such a way so as to surround, e.g., completely surround a combined perimeter of, an upper space of the connection hole 541b and an upper space of the air vent hole 541c. For example, the upper gasket 60 may be positioned on, e.g., directly on, the lower plate 541, and may have a closed-shape surrounding the connection hole 541b and the air vent hole 541c with a single, continuous barrier.

In detail, referring to FIG. 5, the upper gasket 60 may include two upper sealing portions 61 which partially surround the circumference of the connection hole 541b, a support plate 62 externally extending from one side end portion of the upper sealing portion 61, and a connection sealing portion 64 externally protruding between the upper sealing portions 61 which are disposed separately from each other to surround the air vent hole 541c.

The upper sealing portions 61 have an arc-band shape, and are located separately at opposite sides. The connection sealing portion 64 is connected to first side ends of the upper sealing portions 61 and protrudes from the upper sealing portions 61 toward the air vent hole 541c to surround the air vent hole 541c, e.g., the connection sealing portion 64 may be U-shaped with the air vent hole 541c in the center of the "U". Accordingly, a path 63 in fluid communication with an inner space between the air vent hole 541c and the upper sealing portions 61 is formed inside the connection sealing portion 64.

The support plate 62 is connected to the other side end of the upper sealing portions 61 to prevent deformation of the upper gasket 60 and support pressure applied to the upper gasket 60. As such, by connecting the connection sealing portion 64 to the upper sealing portions 61, the connection hole 541b and the air vent hole 541c may be in fluid communication with each other even though the upper gasket 60 is installed. Accordingly, gas above a downwardly convex short-circuit member 56 may move through the air vent hole 541c upon inversion of the short-circuit member

56. That is, when the short-circuit member 56 is deformed to be upwardly convex, an upper space of the short-circuit member 56 is decreased, thereby increasing the pressure inside the upper space of the short-circuit member 56. If the gas existing in the upper space of the short-circuit member 56 cannot move to another space, it may be difficult for the short-circuit member 56 to be reversely deformed, e.g., to be upwardly convex, even when the pressure inside the case 26 is increased.

Therefore, in accordance with the present exemplary embodiment, the air vent hole 541*c* and the connection hole 541*b* may be in fluid communication with each other, so the gas can move to another space through the air vent hole 541*c* by installing the upper gasket 60 to surround the connection hole 541*b* and the air vent hole 541*c* together. Accordingly, the short-circuit member 56 can be easily deformed at a predetermined pressure.

Figure 6:
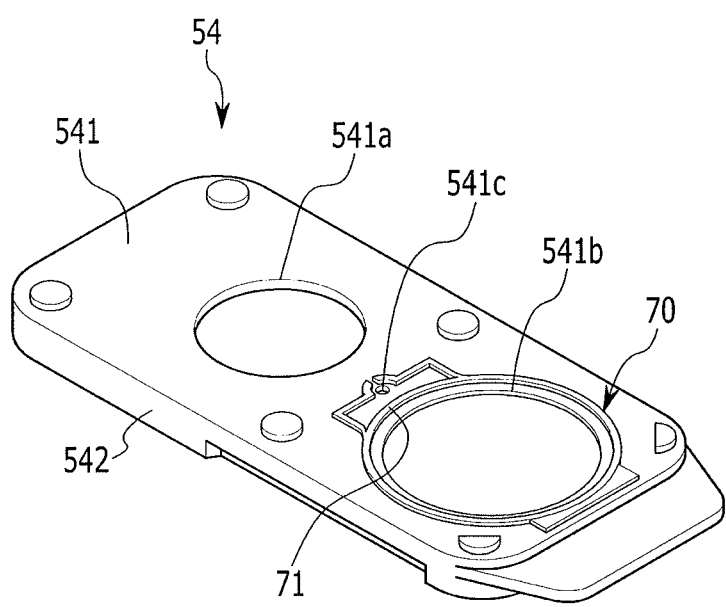
FIG. 6 illustrates a perspective view showing the upper insulating member and a lower gasket when viewed from the bottom in accordance with the present exemplary embodiment.
Figure 7:
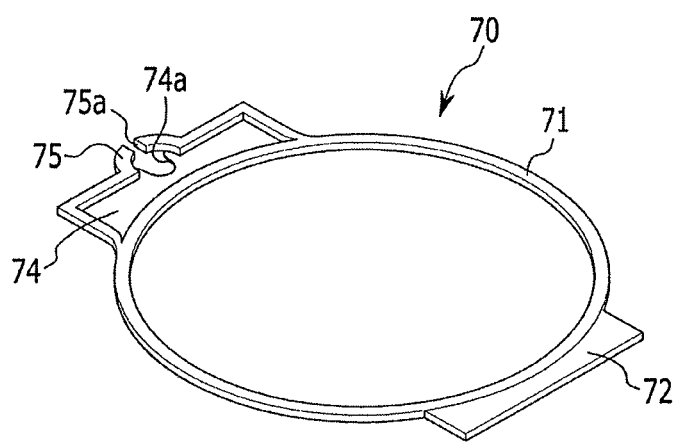
FIG. 7 illustrates a perspective view showing the lower gasket in accordance with the present exemplary embodiment.
Figure 8:
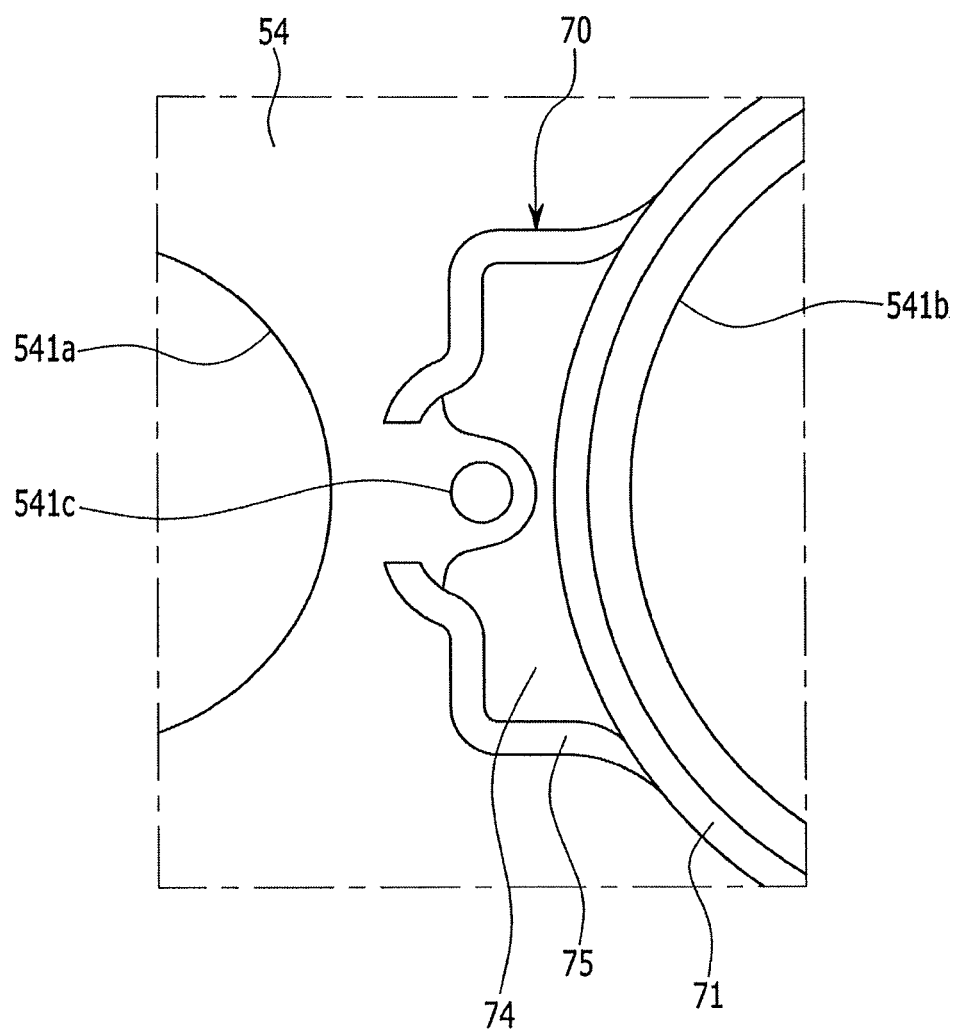
FIG. 8 illustrates a plan view showing a part of the insulating member and the lower gasket in accordance with the present exemplary embodiment.

FIG. 6 illustrates a perspective view of the upper insulating member 54 and the lower gasket 70 when viewed from the bottom, FIG. 7 illustrates a perspective view of the lower gasket 70, and FIG. 8 illustrates a plan view of a part of the insulating member 54 and the lower gasket 70 in accordance with the present exemplary embodiment.

Referring to FIG. 6 to FIG. 8, the lower gasket 70 is disposed between the upper insulating member 54 and the short-circuit member 56. The lower gasket 70 is installed below the connection hole 541*b* to surround a lower portion of the connection hole 541*b*, and includes a lower sealing portion 71 surrounding the circumference of the connection hole 541*b*, a support plate 72 protruding from one side of the lower sealing portion 71, and a guide protrusion 75 protruding at the other side of the lower sealing portion 71 toward the air vent hole 541*c*.

The lower sealing portion 71 is formed in an annular shape to entirely surround a lower circumference of the connection hole 541*b*, e.g., the lower sealing portion 71 may be shaped as a circle surrounding only the connection hole 541*b*. Accordingly, the lower sealing portion 71 may separate, e.g., cut off, the fluid communication between lower spaces of the connection hole 541*b* and the air vent hole 541*c*.

Two guide protrusions 75 may protrude from the lower sealing portion 71 toward the air vent hole 541*c* to partially surround the air vent hole 541*c*. An opening 75*a* may be formed between the guide protrusions 75 to exhaust gas. Further, a guide plate 74 coupled to the guide protrusion 75 and the lower sealing portion 71 may be formed inside the guide protrusion 75, and a guide hole 74*a* in fluid communication with the air vent hole 541*c* is formed in the guide plate 74. The guide plate 74 has a thin-plate shape with a thickness smaller than that of the guide protrusion 75. The support plate 72 is connected to one side of the lower sealing portion 71 to prevent the lower gasket 70 from being deformed and support the pressure applied to the lower gasket 70.

With such a structure, by forming the lower sealing portion 71 and the guide protrusion 75, the lower spaces of the connection hole 541*b* and the air vent hole 541*c* are separated, e.g., cut off, from each other. Accordingly, the gas moving from the upper space of the short-circuit member 56 toward the air vent hole 541*c* upon inversion of the short-circuit member 56 may be exhausted outside through gaps between the members, e.g., through the air vent hole 541*c* and a gap between the bottom surface of the terminal 22 and the upper insulating member 54 connecting the air vent hole 541*c* and the connection hole 541*b*, without moving back inside the case 26 again.

Accordingly, in accordance with the present exemplary embodiment, it is possible to improve sealing performance between the upper insulating member 54 and the short-circuit member 56 by installing the upper gasket 60 and the lower gasket 70, thereby preventing corrosion and short-circuit caused by gas leakage and moisture inflow. Further, it is possible to facilitate safe operation of the short-circuit member 56 at a predetermined pressure by moving the gas existing in the upper space of the connection hole 541*b* to another space.

By way of summary and review, a conventional rechargeable battery having a case made of, e.g., metal, may explode or ignite when an abnormal reaction occurs within the rechargeable battery due to, e.g., increased pressure therein. Therefore, the described technology has been made in an effort to provide a rechargeable battery having improved safety. That is, in accordance with the exemplary embodiment, it is possible to improve sealing performance of the short-circuit member, thereby allowing for easy reverse-deformation of the short-circuit member at a predetermined pressure.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode and a second electrode;
   a case in which the electrode assembly is mounted;
   a cap plate coupled to the case, the cap plate including a short-circuit hole therethrough;
   a first terminal electrically connected to the first electrode;
   a second terminal electrically connected to the second electrode;
   an upper insulating member between the second terminal and the cap plate, the upper insulating member including:
      a connection hole in fluid communication with the short-circuit hole, and
      an air vent hole in fluid communication with the connection hole, the air vent hole being spaced apart from the connection hole and being covered by the second terminal; and
   a short-circuit member in the short-circuit hole, the short-circuit member being between the cap plate and the upper insulating member, and the short-circuit member to deform to electrically connect the first electrode with the second electrode.

2. The rechargeable battery as claimed in claim 1, further comprising an upper gasket between the upper insulating member and the second terminal, the upper gasket being continuous around an entire combined perimeter of the connection hole and the air vent hole.

3. The rechargeable battery as claimed in claim 2, wherein the upper gasket includes:
   an upper sealing portion partially surrounding a circumference of the connection hole; and
   a connection sealing portion protruding from a first end portion of the upper sealing portion toward the air vent hole, the connection sealing portion surrounding the air vent hole.

4. The rechargeable battery as claimed in claim 3, wherein the upper sealing portion includes first and second upper sealing portions connected to each other via the connection sealing portion.

5. The rechargeable battery as claimed in claim 3, wherein the upper gasket further comprises a support plate extending toward an outside of the upper gasket, the support plate being connected to a second end portion of the upper sealing portion.

6. The rechargeable battery as claimed in claim 2, further comprising a lower gasket between the upper insulating member and the short-circuit member, the lower gasket including a lower sealing portion surrounding the connection hole.

7. The rechargeable battery as claimed in claim 6, wherein the lower sealing portion surrounds only the connection hole among the connection hole and the air vent hole, the lower sealing portion cutting off fluid communication between the connection hole and the air vent hole.

8. The rechargeable battery as claimed in claim 6, wherein the lower sealing portion has a circular ring shape.

9. The rechargeable battery as claimed in claim 6, wherein the lower gasket further comprises a guide protrusion protruding from the lower sealing portion toward the air vent hole, the guide protrusion partially surrounding the air vent hole.

10. The rechargeable battery as claimed in claim 9, wherein the lower gasket further comprises:
    a guide plate attached to the guide protrusion and to the lower sealing portion, the guide plate being inside the guide protrusion; and
    a guide hole in the guide plate, the guide hole being in fluid communication with the air vent hole.

11. The rechargeable battery as claimed in claim 9, wherein the lower gasket further comprises a support plate extending toward the outside of the lower gasket, support plate being connected to a first end portion of the lower sealing portion.

12. The rechargeable battery as claimed in claim 1, further comprising:
    a connection terminal electrically connecting the second terminal with the second electrode; and
    a terminal hole in the upper insulating member, the connection terminal being inserted into the terminal hole.

13. The rechargeable battery as claimed in claim 12, wherein the upper insulating member further comprises:
    a lower plate contacting a bottom surface of the second terminal; and
    a side wall along a side end of the lower plate, the side wall protruding above the lower plate and surrounding a side surface of the second terminal.

14. The rechargeable battery as claimed in claim 12, wherein the upper insulating member further comprises a support protrusion with a catching portion protruding toward a center of the lower plate, a support jaw of the second terminal being coupled to the support protrusion.

15. The rechargeable battery as claimed in claim 1, wherein the first terminal is electrically connected to the cap plate through a connection plate, the short-circuit member being electrically connected to the first terminal through the cap plate.

16. The rechargeable battery as claimed in claim 15, wherein the short-circuit member includes a downwardly convex curved portion, and an edge outside the downwardly convex curved portion.

* * * * *